United States Patent
Georgy

(10) Patent No.: US 11,037,011 B2
(45) Date of Patent: Jun. 15, 2021

(54) METHOD FOR OBSERVING THE SURFACE OF THE EARTH AND DEVICE FOR IMPLEMENTING SAME

(71) Applicant: AIRBUS DEFENCE AND SPACE SAS, Toulouse (FR)

(72) Inventor: Pierre-Luc Georgy, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 0 days.

(21) Appl. No.: 16/762,691

(22) PCT Filed: Nov. 8, 2018

(86) PCT No.: PCT/EP2018/080651
§ 371 (c)(1),
(2) Date: May 8, 2020

(87) PCT Pub. No.: WO2019/092126
PCT Pub. Date: May 16, 2019

(65) Prior Publication Data
US 2020/0380283 A1    Dec. 3, 2020

(30) Foreign Application Priority Data
Nov. 9, 2017    (FR) ...................................... 1760538

(51) Int. Cl.
*G06K 9/00*    (2006.01)
*G06K 9/20*    (2006.01)
(Continued)

(52) U.S. Cl.
CPC ......... *G06K 9/2054* (2013.01); *G06K 9/0063* (2013.01); *G06K 9/34* (2013.01);
(Continued)

(58) Field of Classification Search
CPC ............ G06K 9/0063; G06K 9/00637; G06K 9/00651; G06K 9/00657; G06K 9/00664;
(Continued)

(56) References Cited

U.S. PATENT DOCUMENTS 8,184,865 B2 *  5/2012  Sasakawa ............. G06T 3/4038
                                                   382/113
8,958,603 B2 *  2/2015  Boriah ................. G06K 9/4638
                                                   382/109
(Continued)

FOREIGN PATENT DOCUMENTS

| CN | 103954269 | 7/2014 |
| EP | 1 698 856 | 9/2006 |
| WO | 2011/089477 | 7/2011 |

OTHER PUBLICATIONS

International Search Report and Written Opinion of the ISA for PCT/EP2018/080651, dated Jan. 18, 2019, 14 pages.

*Primary Examiner* — Eric Rush
(74) *Attorney, Agent, or Firm* — Nixon & Vanderhye, P.C.

(57) ABSTRACT

A method for acquiring images of the surface of the earth, installing an aerial platform in a quasi-stationary position, equipped with an image acquisition system with a large field of view and a second, high-resolution, image acquisition system is disclosed. The method includes implementing successive observation cycles, each one including the acquisition of an image of a zone of interest by the first system, the partitioning of the image thus acquired into mesh units which each correspond to a sector of the zone of interest, the analysis of the image in order to detect the potential presence of unwanted marks, and the acquisition of an image by the second system for the mesh units for which no unwanted marks have been detected. Observation cycles are thereby (Continued)

Figure 1:
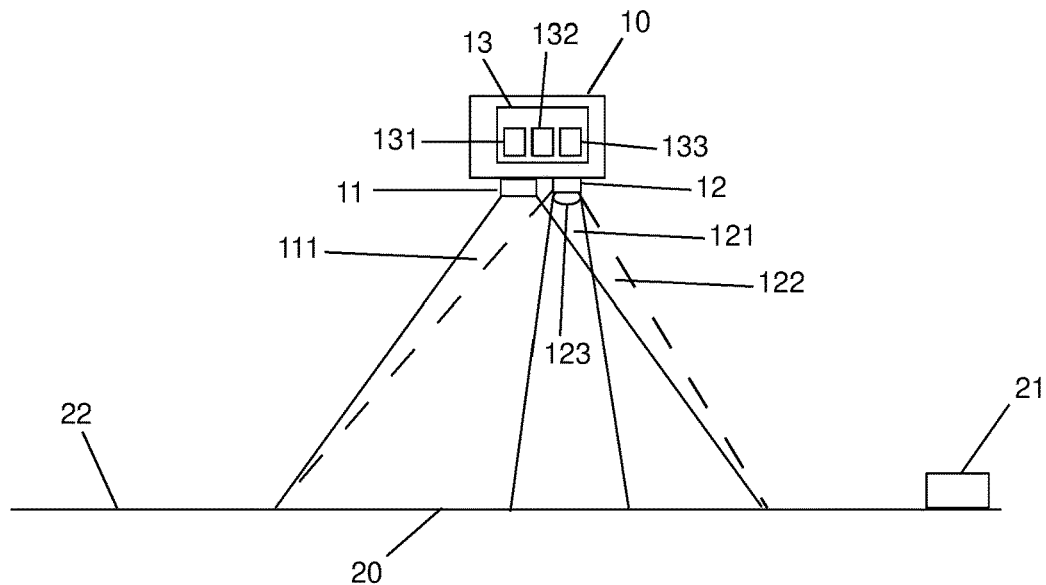

implemented until images of the entire zone of interest have been acquired by the second system.

23 Claims, 2 Drawing Sheets

(51) Int. Cl.
| | |
|---|---|
| *G06T 7/174* | (2017.01) |
| *G06K 9/34* | (2006.01) |
| *G06K 9/62* | (2006.01) |
| *G06T 5/50* | (2006.01) |
| *G06T 7/00* | (2017.01) |
| *H04N 5/232* | (2006.01) |
| *H04N 5/247* | (2006.01) |
| *G06T 7/20* | (2017.01) |
| *B64G 1/10* | (2006.01) |

(52) U.S. Cl.
CPC .............. *G06K 9/6267* (2013.01); *G06T 5/50* (2013.01); *G06T 7/0002* (2013.01); *G06T 7/174* (2017.01); *G06T 7/20* (2013.01); *H04N 5/23203* (2013.01); *H04N 5/247* (2013.01); *B64G 2001/1028* (2013.01); *G06K 2009/2045* (2013.01); *G06T 2207/10032* (2013.01)

(58) Field of Classification Search
CPC ........... G06K 9/00771; G06K 9/00791; G06K 9/00805; G06K 9/20; G06K 9/2054; G06K 9/34; G06K 9/6267; G06K 2009/2045; G06T 5/50; G06T 7/0002; G06T 7/10; G06T 7/11; G06T 7/174; G06T 7/20; G06T 7/223; G06T 7/246; G06T 7/70; G06T 7/97; G06T 2207/10032; G06T 2207/20021; G06T 2207/30188; G06T 2207/30232; H04N 5/23203; H04N 5/247; B64G 1/1021; B64G 2001/1028; B64C 2201/123; B64C 2201/127; G01C 11/02; G03B 15/006
USPC ....... 382/100, 103, 107–109, 173, 181, 218, 382/224, 275, 278, 282–284, 291, 312; 348/117, 143, 144, 158, 159, 169; 396/7; 701/3, 13, 409, 450; 324/323, 330
See application file for complete search history.

(56) References Cited

U.S. PATENT DOCUMENTS

| | | | |
|---|---|---|---|
| 9,126,700 B2* | 9/2015 | Ozkul | G03B 15/006 |
| 9,396,391 B2* | 7/2016 | Navulur | G06K 9/00476 |
| 10,325,295 B1* | 6/2019 | Augenstein | G06Q 30/0283 |
| 2012/0269456 A1* | 10/2012 | Bekaert | G06T 3/4038 |
| | | | 382/284 |
| 2017/0250751 A1* | 8/2017 | Kargieman | G06K 9/0063 |
| 2020/0160029 A1* | 5/2020 | Amselem | G06K 9/0063 |

* cited by examiner

METHOD FOR OBSERVING THE SURFACE OF THE EARTH AND DEVICE FOR IMPLEMENTING SAME

CROSS RELATED APPLICATIONS

This application is the U.S. national phase of International Application No. PCT/EP2018/080651 filed Nov. 8, 2018, which claims priority to French Patent Application No. 1760538 filed on Nov. 9, 2017, the entire contents of each of which are hereby incorporated by reference.

The present invention relates to the field of aerial/satellite observation of the surface of the Earth.

More specifically, the present invention relates to a method for acquiring images of the surface of the Earth, implementing a space or aerial vehicle, as well as a device for implementing this method.

The invention also relates to a method for remotely controlling, and a device for controlling, in particular remotely, such a device.

The observation of the surface of the Earth, for purposes, in particular of mapping, is commonly carried out by aerial vehicles or moving satellites which capture images of zones of this surface, in visible or infrared wavelengths, at the time where they fly over them.

This observation is however often impeded by temporary bad observation conditions, such as the presence above the observed zone of clouds and the shadows thereof, reflections of sunlight, etc. In addition, when the aim is to carry out the mapping of the observed zone, the presence in this zone of mobile objects such as vehicles, aeroplanes, ships, etc., at the time of image acquisition by the aerial vehicle or the satellite can also prove to be unwanted.

It is thus estimated that around 50% of the images acquired by the observation satellites are rejected because of too much cloud coverage of the zone of the surface of the Earth in question, even though the weather forecasts had been considered during the scheduling. The cloud coverage constitutes the main source of uncertainty for the acceptability of an image acquired by an aerial or satellite observation device.

In order to overcome this disadvantage, it has been proposed by the prior art to consider the conditions, in particular the meteorological conditions, occurring at the time of observing the target zone of the surface of the Earth, so as to, each time the satellite passes above this zone, selectively capture images only for the portions of this zone which are stripped of clouds or other unwanted elements.

As an example, document CN 103954269 thus proposes to equip a moving observation satellite with two cameras, of which one at the front of the satellite locates the cloud coverage of the zones which will be flown over by the satellite. The operation of the second camera, which is itself located at the back of the satellite, for the actual acquisition of images of the surface of the Earth, is only triggered when the view is clear.

Document WO 2011/089477 proposes a system embedded on a moving satellite, which makes it possible to determine an order of priority for the acquisition of images of target zones of which the satellite approaches. This system implements several image acquisition devices, one of which makes it possible to obtain a view of the cloud coverage above target zones, before the satellite reaches them, and the other acquires images of the sole target zones for which it is determined that the cloud coverage is acceptable.

Document EP 1 698 856 also describes a method for obtaining data relating to a target zone, which implements two sensors carried by one or more moving satellites. The analysis of the data collected by a first sensor makes it possible to control the second sensor for capturing data.

None of the solutions proposed by the prior art does however make it possible to guarantee the obtaining of a complete and satisfactory image of a given zone of interest. When it is achieved, such an obtaining furthermore requires a relatively long, and therefore financially damaging, time, The present invention aims to overcome the disadvantages of the solutions proposed by the prior art for the aerial/satellite observation of the surface of the Earth, in particular the disadvantages outlined above, by proposing a method, and a device for the implementation thereof, which make it possible to observe as completely as possible a target zone of the surface of the Earth, i.e. to obtain images of good resolution and with no marks which are unwanted for the use of which these images are intended, of as much as possible, preferably of the entirety, of the surface of this target zone, at least in case of absence of cloud coverage or in case of partial cloud coverage of this target zone.

The invention also aims for this to be able to be carried out as quickly as possible, with as few acquisition steps as possible, and what is more, by means of simple equipment.

In order to achieve these aims, the present invention goes against the solutions proposed by the prior art.

The methods proposed by the prior art for observing a target zone are indeed all designed so as to determine, for a moving observation satellite (or an aerial vehicle), i.e. a satellite moving above the surface of the Earth at a great speed, of several thousands of km/h, which portions of the target zone must be acquired during the specific short time window available for the observation when the satellite passes above the target zone. These methods thus aim at optimizing the images acquired during a short specific time window available for the observation, typically of a few tens of seconds, during the rapid passage of the satellite above the target zone, so as to capture the maximum amount of clear images of the target zone during this given time. It is the accumulation of the images acquired at each passage of the satellite above the target zone which makes it possible, as the successive passages of the satellite occur, to obtain a more and more complete coverage of the target zone.

While the methods of the prior art thus operate by combination of opportunities of observation of a zone, which are not correlated together, on the contrary the method according to the invention advantageously provides for implementing, not a moving satellite, but one or a pair of space or aerial vehicle(s), which remains in a quasi-stationary position above the target zone for the whole time that is necessary to obtain a coverage of this zone that is as complete as possible in good observation conditions. The method according to the invention thus advantageously is not dependent on a random variation of the observation conditions of the target zone between two passages of a satellite above this zone. On the contrary, it takes advantage of this variation of the observation conditions for a given target zone, to ensure, without losing sight of the target zone, a complete observation of the target zone for a duration that is as reduced as possible, by an optimisation of the order of image acquisition of the different sectors constituting the target zone according to the evolution in real time of the position of unwanted elements on this target zone.

Thus, a method for acquiring images of the surface of the Earth is proposed according to the invention, which comprises steps of:

placing a first aerial or space platform in a quasi-stationary position above the surface of the Earth, i.e. in the sense of the present invention, in a stationary position or moving at a speed less than 200 km/h above the surface of the Earth, this first platform comprising a first image acquisition system with a field of view covering a zone, called zone of interest, of the surface of the Earth;

placing of a second aerial or space platform in a quasi-stationary position above the surface of the Earth, i.e. in the sense of the present invention, in a stationary position or moving at a speed less than 200 km/h above the surface of the Earth, this second platform comprising a second image acquisition system with a narrower field of view and of better resolution than the first image acquisition system, the field of view of the second image acquisition system being orientable such that the field of regard of this second image acquisition system covers the zone of interest;

implementing an observation cycle comprising steps of:
  a/ acquiring an image of the zone of interest by the first image acquisition system,
  b/ partitioning of the image thus acquired, called preliminary image, into mesh units each corresponding to a sector of the zone of interest capable of being included in the field of view of the second image acquisition system,
  c/ analysing the preliminary image to detect the potential presence of marks representative of unwanted elements, such as clouds, shadows, the reflection of the sun, or even, according to the uses for which the observation of the zone of interest is intended, mobile entities, in or above the zone of interest,
  d/ identifying mesh units of the preliminary image comprising no mark representative of unwanted elements, these mesh units corresponding to so-called favourable sectors of the zone of interest,
  e/ and, if applicable, if mesh units of the preliminary image comprising no mark representative of unwanted elements have been identified, acquiring an image, called final image, of at least one, in particular several, or if optionally all, of the favourable sector(s) by the second image acquisition system,
  and, if a predetermined rate of sectors of the zone of interest for which a final image has been acquired by the second image acquisition system has not been achieved, repeat(s) of the observation cycle until said rate, called rate of sectors with an acquired final image, is achieved.

The repeat(s) of the observation cycle are carried out without the zone of interest having at some time fully exited the field of view of the first image acquisition system and of the field of regard of the second image acquisition system. In other words, according to the invention, the first observation cycle and the repeat(s) of this observation cycle are carried out during one same passage of the first aerial or space platform and of the second aerial or space platform above the zone of interest, the zone of interest having remained all the time in the field of view of the first image acquisition system and in the field of regard of the second image acquisition system.

Preferably, the rate of sectors with an acquired final image is equal to 100%, so that the observation cycle is repeated until the images of all of the sectors of the zone of interest have been acquired by the second image acquisition system.

In particular implementation embodiments of the invention, the method comprises a step of validating the conformity of the final images acquired by the second image acquisition system with respect to one or more preestablished criterion/criteria, such as, for example, an absence of unwanted marks on the final image, and, if a predetermined rate of sectors of the zone of interest for which a final image has been validated has not been achieved, the method comprises the repeat(s) of the observation cycle until said rate, called rate of sectors with validated final images, is achieved. Preferably, this rate is equal to 100%, so that the observation cycle is repeated until the images of all of the sectors of the zone of interest have been acquired by the second image acquisition system and validated for the conformity thereof with respect to the preestablished criterion/criteria.

Thus, the method according to the invention preferably comprises, when at the end of the observation cycle an image of each of the sectors constituting the zone of interest has not been acquired by the second image acquisition system, or optionally, acquired and validated, the repeating of said observation cycle until an image of each of the sectors of the zone of interest has been acquired by the second image acquisition system, or optionally, acquired and validated.

According to the use for which the images of the zone of interest are intended, the rate of sectors with acquired final image and/or the rate of sectors with validated final image can otherwise be chosen at values less than 100%. They are, in particular, defined by the end user of the images acquired of the zone of interest.

The field of view of an image acquisition system herein designates, in a conventional way, the field that this system sees at a given instant. The field of regard is, also conventionally, the field which is accessible to the image acquisition system, according to the different possible orientations of the field of view thereof.

The image acquisition systems implemented according to the invention are conventional in themselves, and operate preferably in the visible and/or infrared wavelengths. They can, in particular, be systems for the acquisition of a fixed image, such as a photographic appliance; or, in particular for the case of the second image acquisition system, systems for the acquisition of a video, i.e. a short series of images, such as a camera; or else appliances carrying out another type of optical measurement, for example, a interferometer.

The first image acquisition system preferably has a large field of view, preferably encompassing the field of regard of the second image acquisition system. It will be designated in the present description by the terms "large field acquisition system". The resolution thereof may be low. It can, for example, be of around a tenth of the size of the field of view of the second image acquisition system. The second image acquisition system preferably has a high resolution, for example of around 1 metre. It will be designated by the present description by the terms "high-resolution acquisition system".

The second image acquisition system preferably has an orientable field of view, and is arranged with respect to the first image acquisition system, such that the field of regard of the second image acquisition system is superposed substantially with the field of view of the first image acquisition system over a large surface of the ground, making it possible to observe at least 400 $km^2$ of the surface of the Earth. The field of view of the second image acquisition system can itself be configured so as to make it possible, for example, to observe 1 $km^2$ of the surface of the Earth.

Steps b/ and c/ of the observation cycle according to the invention can be carried out according to any order, or even simultaneously.

Preferably, the partitioning of the preliminary image is carried out such that each sector of the zone of interest corresponding to a mesh unit occupies substantially all the field of view of the second image acquisition system.

To capture final images of the favourable sectors, the field of view of the second image acquisition system is suitably oriented, successively, towards each of the sectors concerned, between two actual image acquisition phases.

In the present description, by quasi-stationary position, it is meant that the aerial or space platform remains in a stationary position, strictly speaking, or in a quasi-stationary position, above a zone of the surface of the Earth, i.e. in the sense of the present invention, that it remains above this zone for a sufficiently long duration to make it possible to acquire substantially all of the sectors constituting the zone of interest under good meteorological conditions with no cloud coverage. This duration depends on the particular climatic conditions, in particular wind conditions, occurring for the zone of interest, and of the moving speed of the clouds which results from these conditions. It is up to the person skilled in the art to determine this duration, and the maximum speed of movement of the associated platform, which will ensure that the platform remains onsite for sufficiently long to achieve the objective set by the present invention, of obtaining a clear high-resolution image of a high predetermined rate of the zone of interest.

In the context of the present invention, it is considered that the aerial or space platform is quasi-stationary when it moves above the surface of the Earth at a speed less than 200 km/h or that it does not move with respect to the surface of the Earth.

Preferably the first aerial or space platform moves above the surface of the Earth such that the zone of interest remains, at least partially and preferably totally, in the field of view of the first image acquisition system for at least 5 minutes, preferably for at least 20 minutes.

Preferably, the second aerial or space platform moves above the surface of the Earth such that the zone of interest remains, at least partially and preferably totally, in the field of regard of the second image acquisition system for at least 5 minutes, preferably for at least 20 minutes.

In variants of the invention, it is otherwise considered that the aerial or space platform is quasi-stationary when it moves at any speed, including at a speed greater than 200 km/h, with respect to the zone of interest, but always remains substantially above this zone of interest, for example by carrying out back-and-forth movements or circles above this zone, so that the persistence time of the platform above the zone is sufficiently long for the implementation of the method according to the invention. This persistence time of the platform above the zone of interest is preferably at least 5 minutes, and preferably at least 20 minutes.

Typically, for a zone of interest having a split cloud coverage of less than 50% moving at at least 30 km/h, a duration of flying over the zone of interest, during which the zone of interest remains in the field of view of the first image acquisition system, and in the field of regard of the second image acquisition system, of around twenty minutes, is generally sufficient to ensure that all of the zone of interest will have been able to be observed by the second image acquisition system.

The first platform and the second platform according to the invention can be separate from one another.

In variants of the invention, they are one single and same platform, which carries both the first image acquisition system and the second image acquisition system.

The method according to the invention thus implements one or two aerial or space observation platform(s), each in a position can be qualified as persistent above the zone of the surface of the Earth to be observed, and equipped with two observation/image acquisition systems. A first system with a large field of view is used to estimate the observation conditions, such as the presence of clouds and the shadows thereof, the reflections of the sun, etc., in real time. This estimation makes it possible to orient the acquiring of images achieved by the second observation/image acquisition system on the sectors of the zone of interest where the conditions are good, this second system itself being of high-resolution, so that it generates high-quality images. Even in case of cloud coverage of the zone of interest, the observation conditions changing over time, in particular as the clouds move, a high-resolution acquiring, under good observation conditions, is obtained by implementing successive observation cycles of the method according to the invention in as many points as wanted of the zone of interest.

This can advantageously be carried out as quickly as is possible according to the conditions, specifically particularly ongoing climatic conditions, and by means of a device of simple design.

The method according to the invention can furthermore respond to one or more of the features described below, implemented individually or in each of the technically operating combinations thereof.

In particular implementation embodiments of the invention, for at least one observation cycle, preferably for all the observation cycles, except for the first cycle, no acquiring of a final image is carried out by the second image acquisition system for the sectors of the zone of interest for which a final image has been acquired, or optionally, acquired and validated, during a preceding observation cycle. Such a feature advantageously makes it possible to obtain, all the more quickly, a total observation of the zone of interest, by avoiding the acquiring of redundant final images.

When the method according to the invention comprises a step of validating the conformity of the final images acquired by the second image acquisition system, this conformity is evaluated according to one or more preestablished criterion/criteria. This validation step can be implemented at the end of each observation cycle, so as to make it possible for a new acquiring of final images to be carried out, during the following observation cycle, for favourable sectors for which the final image acquired beforehand has not been deemed to be acceptable. It can otherwise be carried out at any time, all of the final images of a given observation cycle being considered acceptable by default, then reclassified, if necessary, as non-acceptable subsequently during the implementation of the method, the corresponding sectors then being reintegrated in the list of the sectors of which a final image must still be acquired.

This step of validating the conformity of the final images can be carried out by analysing these final images themselves, or else by analysing the corresponding preliminary image acquired by the first image acquisition system.

This analysis can be carried out remotely, in particular from the ground, or by a validation module embedded on one of the platforms.

According to the use for which the images of the zone of interest are intended, several configurations can be considered according to the invention. It can, for example, be decided that the platform(s) will remain for sufficiently long above the zone of interest for the final images of all of the sectors of the zone of interest to have been acquired, or optionally acquired and validated. Otherwise, it can be decided that it is acceptable that for a given number of sectors of the zone of interest, high-resolution images are acquired even when these sectors are not completely clear, this for time saving purposes.

Thus, the method according to the invention can further comprise, after implementation of a predetermined number of successive observation cycles, if the final image of one or more sectors of the zone of interest has not yet been acquired, a step of acquiring final images, by the second image acquisition system, of these unfavourable sectors, preferably only if the rate of cloud coverage above these sectors is greater than a predetermined threshold value.

In particular implementation embodiments of the invention, the method comprises, for at least one observation cycle, preferably for all the observation cycles, except for the first cycle, after step d/ of identifying mesh units of the preliminary image comprising no mark representative of unwanted elements, a step of determining an order of priority of the sectors of the zone of interest for the acquiring of images by the second image acquisition system, according to one or more preestablished criterion/criteria. This or these criterion/criteria are in particular chosen according to the particular aim for which the observation of the zone of the surface of the Earth is intended.

In particular implementation embodiments of the invention, adapted to the configurations wherein the second aerial or space platform moves, at a slow speed, above the surface of the Earth, the second aerial or space platform moves at a speed less than 200 km/h above the surface of the Earth, and in this step of determining an order of priority of the sectors of the zone of interest for acquiring images by the second image acquisition system, a higher degree of priority is attributed to the favourable sectors for which the time remaining before the exiting thereof outside of the field of regard of the second image acquisition system is the shortest, while being greater than the time necessary for the acquiring of an image of said sector by the second image acquisition system. This remaining time can be determined by considering the direction and the speed of movement of the second aerial or space platform above the surface of the Earth.

In particular embodiments of the invention, the step of determining an order of priority of the sectors of the zone of interest for the acquiring of images by the second image acquisition system comprises:

f/ from data of direction and speed of movement of each unwanted element in or above the zone of interest, determination for each favourable sector of the zone of interest for which a final image has not yet been acquired, or optionally also for some other sectors, even for all the sectors, of the remaining time before the appearance of an unwanted element in or above said sector, g/ classifying said sectors by order of priority for the acquiring of images by the second image acquisition system, an even higher degree of priority being attributed to the favourable sectors for which the remaining time before the appearance of an unwanted element is the shortest, while being greater than the time necessary for the acquiring of an image of said sector by the second image acquisition system. This time includes, in particular, the time necessary for the actual acquiring of images, as well as the time necessary for the prior suitable reorientation of the field of view of the second image acquisition system.

Preferably, in this observation cycle, no step of acquiring images is carried out by the second image acquisition system for the sectors for which the remaining time before the appearance of an unwanted element is less than or equal to the time necessary for the acquiring of an image of said sector by the second image acquisition system.

In such embodiments, by ensuring that the priority is given, if applicable to the favourable sectors of the zone of interest which will be the first ones to exit the field of regard of the second image acquisition system, then to the favourable sectors of the zone of interest for which the observation conditions, in particular the cloud coverage, will be degraded the most quickly, the method according to the invention advantageously makes it possible to optimise the duration necessary for the complete observation, under good conditions, of the zone of interest.

Preferably, the step of acquiring a final image by the second image acquisition system is only carried out for the favourable sectors for which the remaining time before the appearance of an unwanted element is greater than the time necessary for the acquiring of an image of said sector by the second image acquisition system, added to a safety margin. It is within the skills of a person skilled in the art to determine the value of this margin, according in particular to the ongoing climatic conditions at the zone of interest, and in particular the accuracy of knowledge of the movement speed of the clouds, and, if applicable, of the movement speed of the second platform above the zone of interest, in order to ensure that no unwanted element will appear in the favourable sector concerned before the end of the step of acquiring an image of this sector by the second image acquisition system.

Such features advantageously ensure that the observation of all of the zone of interest is carried out in an optimal time, by ensuring, in particular, that the acquiring of a final image of each favourable sector is carried out while this sector is free of unwanted elements.

The data of direction and speed of movement of each unwanted element, in particular clouds and the shadows thereof, in or above the zone of interest, can be determined by any conventional means, in particular from meteorological data available for the zone concerned.

Preferably, the method comprises, in the observation cycle concerned, a step of determining data of direction and speed of movement of each unwanted element in or above the zone of interest by:

f1/ comparing the preliminary image acquired during said observation cycle with the preliminary image acquired during a preceding observation cycle, f2/ determining, from this comparison and from the time interval between the respective acquisitions of preliminary image of said two observation cycles, of the direction and of the speed of movement of each unwanted element in or above the zone of interest.

In particular implementation embodiments of the invention, the time interval between the respective steps a/ of acquiring a preliminary image of the zone of interest by the first image acquisition system of two successive observation cycles is of between 1 second and 2 minutes. It can, for example, be of around 10 seconds.

For step e/ of acquiring a final image of each of the sectors of the zone of interest, the frequency for acquiring images by the second image acquisition system is preferably of between 1 and 50 images per second, for example of around 2 images per second.

The method according to the invention can also comprise a step of prioritising sectors of the zone of interest of which an image must be acquired by the second image acquisition system, according to any wanted criterion, the prioritisation criterion/criteria depending in particular on the use for which the final images acquired by the method according to the invention are intended. As outlined above, when the second platform moves above the zone of interest, the sectors located behind, with respect to the direction of movement of the second platform, which will be the first ones to exit of the field of regard of the second image acquisition system, are preferably observed in priority by this second system.

The first aerial or space platform and the second aerial or space platform are preferably each placed at an altitude greater than 10 km above the zone of interest, preferably of at least 18 km. It is thus advantageously ensured that they are located at a sufficient height to ensure a large coverage of the ground, avoid the windy currents which are located at lesser altitudes, and avoid the air corridors of passenger and goods transport.

These platforms can consist of any aerial or space vehicle capable of being placed in a quasi-stationary position, in the sense of the present invention, above the surface of the Earth, at an altitude greater than 10 km, and in particular, for the second platform, capable of making it possible to access, at high resolution, any point of a large field of regard for a long period of time.

The first platform and/or the second platform can in particular be balloons.

They can otherwise be stratospheric drones, such as for example, a high-altitude pseudo-satellite (HAPS) such as the Airbus Defence and Space Zephyr. Such a pseudo-satellite, operating conventionally in the stratosphere, at more than 20 km of altitude above the surface of the Earth, in particular has the advantages of a solar supply, and of a limited operating cost, in particular with respect to conventional satellites. In such a case, it is absolutely advantageous in the scope of the invention that the first image acquisition system and the second image acquisition system are located on the same platform.

The first platform and/or the second platform can otherwise be geostationary satellites. In such a configuration in particular, it can be considered according to the present invention that the first image acquisition system and the second image acquisition system be located on the same platform, or that they be located on different platforms.

In particular, when the second platform according to the invention is a geostationary satellite, it can be provided in the context of the invention that the platform is constituted by a geostationary satellite equipped with a conventional first image acquisition system, which is already in orbit for other missions, such as a Meteosat satellite.

Then, the method according to the invention can comprise, for each preliminary image acquired by the large-field image acquisition system conventionally equipping such satellites, a step of transmitting this preliminary image to a system for analysing images and for controlling the second image acquisition system for the implementation of the observation cycle according to the invention.

The first image acquisition system can be configured such that the field of view thereof be fixed or orientable according to different angles in the direction of the surface of the Earth.

In particular implementation embodiments of the invention, step b/of partitioning the preliminary image in mesh units is carried out such that the contiguous mesh units overlap at their peripheral edges. Any discontinuity between the images of contiguous sectors of the zone of interest is thus advantageously avoided, which ensures that the zone of interest can be observed at any point.

The method according to the invention can simultaneously implement a single, or a plurality, of second image acquisition systems, each responding to and operating according to one or more of the features described above. These second image acquisition systems are preferably carried by the same second platform.

These second image acquisition systems can be used to acquire, at different times of one same observation cycle, an image of the same favourable sector, so as to obtain redundant data for this sector, increasing by doing so the reliability of the method; or to acquire, at the same time, images of different favourable sectors of the zone of interest; or else to acquire, at the same time, images of the same favourable sector by different viewing angles, thus making it possible to obtain a three-dimensional representation of this sector.

In particular implementation embodiments of the invention, the method further comprises a step of moving the platform(s) above a different zone of the surface of the Earth when images of all of the sectors of the zone of interest have been acquired by the second image acquisition system. The steps of the method can then be implemented, similarly to what has been described above, for a new zone of interest.

When the first and/or the second platform are geostationary satellites, the method can comprise, when images of all of the sectors of the zone of interest have been acquired by the second image acquisition system, a step of pointing the image acquisition systems towards a different zone of the surface of the Earth, for implementation of the method according to the invention for this new zone.

The different steps of the method according to the invention implementing the image analysis and the controlling of the operation of the image acquisition systems are preferably carried out on board of the platform itself. Otherwise, they can be carried out remotely, in particular from a control station on the ground. These steps can advantageously be carried out fully automatically, on the basis of criteria defined beforehand by an operator.

When the method according to the invention implements, as a first platform, a geostationary satellite already in orbit for other missions, such as a Meteosat satellite, the control for the implementation of the method according to the invention can comprise the control of the placement of the first platform and/or the image acquisition by the first image acquisition system carried by this first platform; or also the identification of the geostationary satellite already located in a suitable position for the implementation of the method according to the invention; and/or also the identification of the preliminary image acquired by the first image acquisition system for another use, which is suitable for the implementation of a given observation cycle of the method according to the invention, and the obtaining of this preliminary image.

The present invention also relates to a computer program product comprising a set of program code instructions which, when they are executed by a processor, implement a method for acquiring images of the surface of the Earth according to the invention, at least for some of the steps thereof.

According to another aspect, the invention relates to a device for the acquiring of images of the surface of the Earth. This device comprises:
  a first aerial or space platform configured to be able to be maintained in a quasi-stationary position above the surface of the Earth, i.e. to be able to be maintained in a stationary position above the surface of the Earth or to move at a speed less than 200 km/h above the surface of the Earth, this first platform comprising a first image acquisition system configured such that the field of view thereof can cover a zone of the surface of the Earth, called zone of interest, when the first platform is placed above the surface of the Earth;

a second aerial or space platform configured to be able to be maintained in a quasi-stationary position above the surface of the Earth, i.e. to be able to be maintained in a stationary position above the surface of the Earth or to move at a speed less than 200 km/h above the surface of the Earth, this second platform comprising a second image acquisition system having a narrower field of view and a better resolution than the first image acquisition system, the field of view of the second image acquisition system being orientable and the second image acquisition system being configured such that the field of regard thereof can cover the zone of interest covered by the field of view of the first image acquisition system when the second platform is placed above the zone of interest;

a system for analysing images and for controlling the first image acquisition system and the second image acquisition system for the implementation of the steps of the observation cycle of a method according to the invention, and the potential repeat(s) of this observation cycle.

The platforms and the constitutive elements thereof can respond to one or more of the features described above in reference to the method for acquiring images according to the invention.

In particular embodiments of the invention, the first platform and the second platform are one single and same platform.

In other embodiments of the invention, they are separate from one another, in particular when they are geostationary satellites.

The system for analysing images and for controlling the first image acquisition system and the second image acquisition system can comprise a module for validating the conformity of the final images acquired by the second image acquisition system, with respect to one or more preestablished criterion/criteria.

The system for analysing images and for controlling the first image acquisition system and the second image acquisition system for the implementation of the steps of the observation cycle(s) of a method according to the invention can be arranged in a platform itself, or in a remote control station, in particular on the ground, or else partially in a platform and partially in one or more remote control stations.

In particular embodiments of the invention, the system for analysing images and for controlling comprises:

a module for analysing images for detecting marks on each preliminary image acquired by the first image acquisition system, the partitioning of the preliminary image in mesh units and identifying mesh units that comprise no mark representative of an unwanted element in or above the zone of interest, and a module for controlling the first image acquisition system and the second image acquisition system for the acquiring of images. This control includes, in particular, the triggering and the stopping of taking images by each system, as well as the orientation of the field of view of the second image acquisition system.

The system for analysing images and for controlling preferably further comprises a calculation module configured to determine, for at least one, preferably for each observation cycle, an order of priority of the sectors of the zone of interest for the acquiring of images by the second image acquisition system, according to one or more preestablished criterion/criteria, in particular by considering the direction and the speed of movement of the second aerial or space platform above the surface of the Earth, and/or in particular by:

from data of direction and speed of movement of each unwanted element above the zone of interest, determining for at least each favourable sector of the zone of interest for which a final image has not yet been acquired, of the remaining time before the appearance of an unwanted element, the classifying of said sectors by order of priority for the acquiring of images by the second image acquisition system, an even higher degree of priority being attributed to the favourable sectors for which the remaining time before the appearance of an unwanted element is the shortest, while being greater than the time necessary for the acquiring of an image of said sector by the second image acquisition system.

Preferably, the calculation module is configured to carry out, for at least one, preferably for each, observation cycle, except for the first observation cycle, the comparison of the preliminary image acquired during said observation cycle with the preliminary image acquired during a preceding observation cycle, and determining, from said comparison and from the time interval between the respective acquisitions of preliminary image of said two observation cycles, of the direction and of the speed of movement of each unwanted element above the zone of interest.

Another aspect of the invention relates to a method for remotely controlling a device for the acquiring of images of the surface of the Earth, responding to one or more of the features described above, for the implementation of steps of a method for acquiring images of the surface of the Earth according to the invention, in particular all of the steps thereof, or some of the steps thereof only (in particular, when the method according to the invention implements a geostationary satellite already in orbit for other missions). According to this method for remotely controlling, the device for acquiring images of the surface of the Earth is remotely controlled by a control device, in particular on the ground, control signals being successively determined and sent to the device for the acquiring of images of the surface of the Earth by this control device, to carry out said steps.

Another aspect of the invention relates to a control device which comprises means configured to control, preferably remotely, in particular from the surface of the Earth, a device for the acquiring of images of the surface of the Earth, responding to one or more of the features described above, by transmission of successive control signals to said device for the acquiring of images of the surface of the Earth, to carry out steps of the method according to the invention for acquiring images of the surface of the Earth.

This control device, in particular controlling from the ground, is conventional in itself and can comprise one or more antennas for receiving signals from the device for the acquiring of images of the surface of the Earth, and for emitting instruction signals in the direction of the latter. It can comprise computers and means for processing and storing data received from the device for the acquiring of images of the surface of the Earth. The latter is in particular preferably equipped with a control module, comprising in particular one or more processors, enslaved to a communication module cooperating with the control device.

Figure 2:
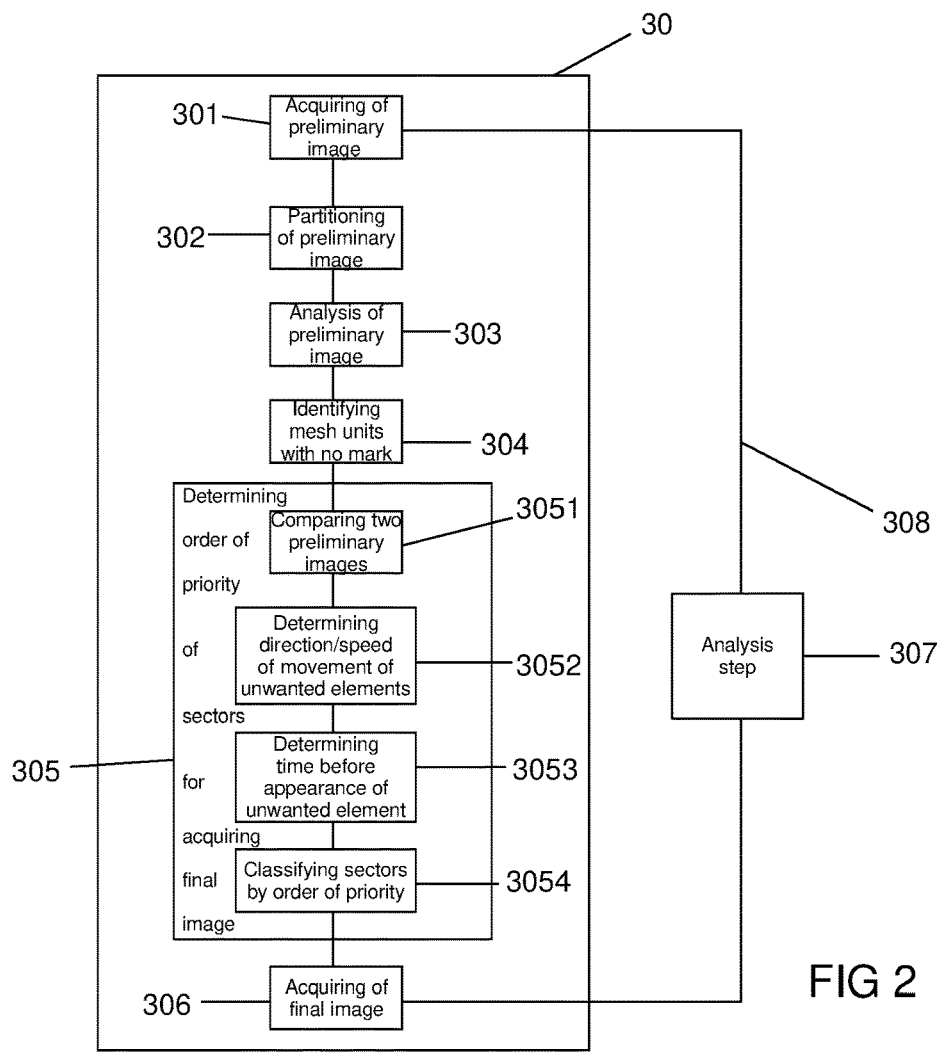
Figure 3A:
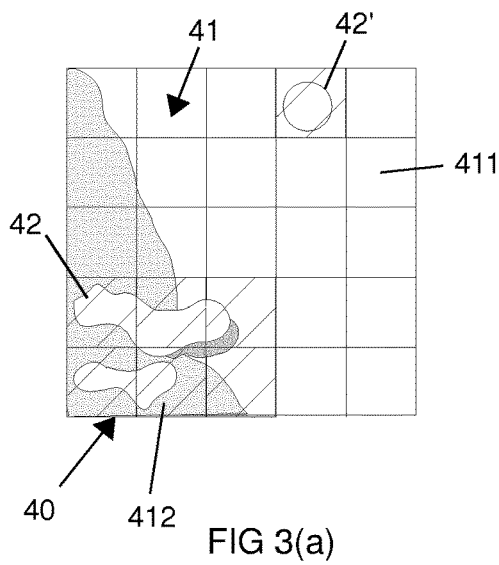
Figure 3B:
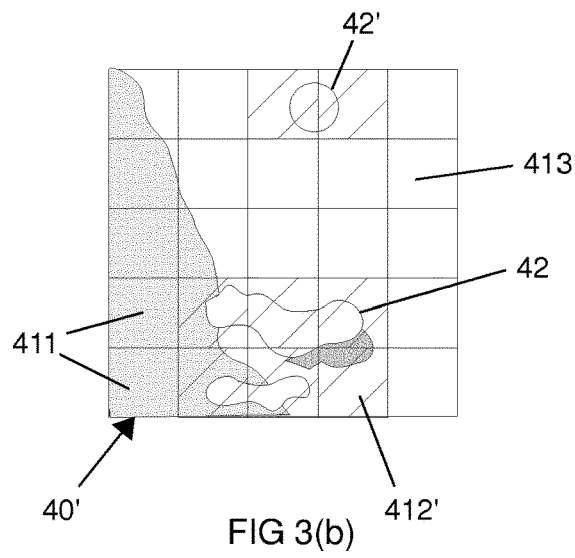
Figure 3C:
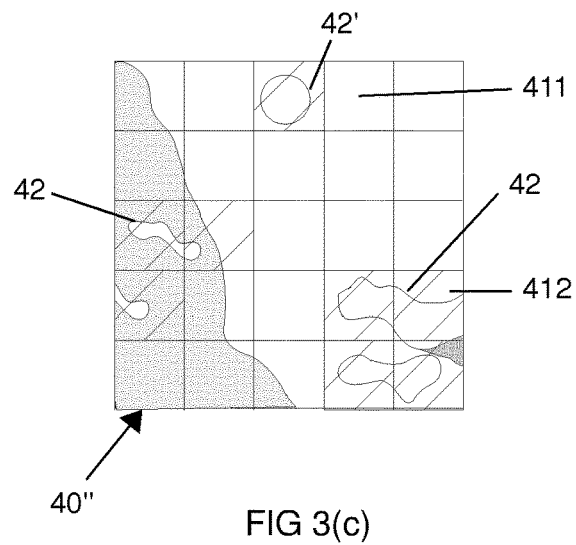
Figure 4:
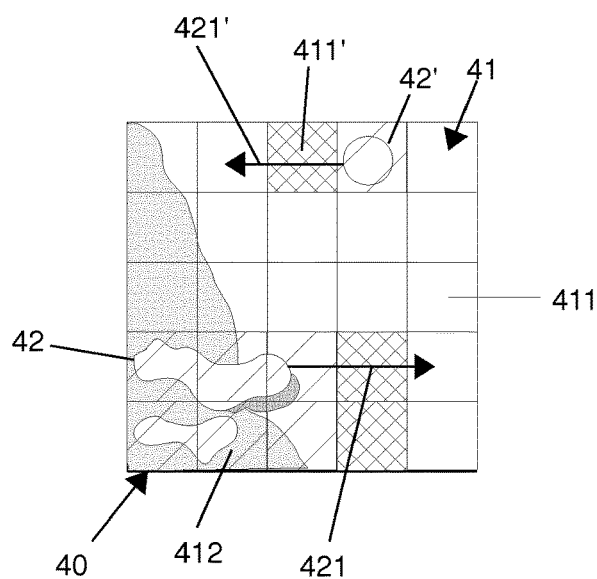

The features and advantages of the invention will appear more clearly in the light of the implementation examples below, provided simply for illustrative purposes, and not at all limiting of the invention, with the support of FIGS. 1 to 4, wherein:

FIG. 1 schematically represents a platform according to a particular embodiment of the invention;

FIG. 2 shows a block diagram illustrating the main steps of a method according to an embodiment of the invention;

FIGS. 3(a), 3(b), and 3(c) illustrates steps of partitioning in mesh units preliminary images acquired during successive observation cycles and of prioritising the sectors of the zone of interest for the acquiring of images by the high-resolution image acquisition system, of a method according to a particular embodiment of the invention;

and FIG. 4 illustrates the step of partitioning in mesh units a preliminary image acquired during an observation cycle and of prioritising the sectors of the zone of interest for the acquiring of images by the high-resolution image acquisition system, of a method according to a more sophisticated particular embodiment of the invention.

In this example, the case is considered where the first image acquisition system and the second image acquisition system are carried by one single and same aerial or space platform 10, such an embodiment however not being at all limiting of the invention.

An example of such an aerial or space platform 10 that can be implemented in the scope of a method according to the invention, for the acquiring of images of a zone of interest 20 of the surface of the Earth 22, is shown in FIG. 1.

This platform 10 can be of any type capable of being placed in a quasi-stationary position, i.e. in particular by not moving or by moving at a speed less than 200 km/h, above the zone of interest 20. It is preferably a high-altitude pseudo-satellite such as the Airbus Defence and Space Zephyr, or a geostationary satellite.

The platform 10 is maintained at an altitude greater than 10 km above the zone of interest 20.

The platform 10 is equipped with two separate image acquisition systems which are configured to observe towards the zone of interest 20 when the platform 10 is located substantially just above this zone.

A first image acquisition system 11, called "large-field system", has a sufficiently large field of view 111 to cover the zone of interest 20 when the platform 10 is located substantially just above this zone. When the platform 10 is a high-altitude pseudo-satellite, it can for example be a camera with a 70° field of view equipped with a detector of 4 megapixels, delivering images of around 15 m of resolution. When the platform 10 is a geostationary satellite, it can for example be a meteorological instrument in geostationary orbit, of 500 m of resolution.

A second image acquisition system 12 (called "high-resolution system") have a narrower field of view 121, but a higher resolution than the large-field system 11. This field of view 121 can be pointed along various axes in direction of the zone of interest 20, so that the field of regard 122 of the high-resolution system, illustrated as a dotted line in FIG. 1, also covers the zone of interest 20, of which it is wanted to obtain images. The orientation of the field of view 121 of the high-resolution system 12 can, in particular, be achieved by a mirror system 123, represented schematically in FIG. 1, conventional in itself. When the platform 10 is a high-altitude pseudo-satellite, it can for example, be a camera with a 3° field of view equipped with a detector of 30 megapixels, delivering images of around 0.2 m of resolution, and placed on a pointing system making it possible to orient the line of sight at +/−30° according to the pitch and the roll. When the platform 10 is a geostationary satellite, it can for example be a space telescope of 4 m of resolution over a field of 10,000 km$^2$.

The platform 10 can also integrate a system 13 for analysing images and for controlling the large-field system 11 and the high-resolution system 12.

This system 13 for analysing images and for controlling comprises for example at least one processor and at least one electronic memory wherein a computer program product is stored, in the form of a set of program code instructions to be executed to implement the different steps of a method for acquiring images of the surface of the Earth according to the invention. These steps will be described in a detailed manner below in the present description.

In a variant, the system for analysing 13 images and for controlling, also comprises one or more programmable logic circuit, of the FPGA, PLD, etc. type, and/or application-specific integrated circuits (ASIC) adapted to implement all or some of said steps of the control method. In other words, the system 13 for analysing images and for controlling, comprises a set of means configured in a software manner (specific computer program product) and/or in a hardware manner (FPGA, PLD, DSP, ASIC, etc.) to implement the different steps of a method for acquiring images of the surface of the Earth according to the invention.

The system 13 for analysing images and for controlling, preferably comprises a module 131 for analysing images making it possible to:

detect, on given images, marks which can be attributed to unwanted elements in the corresponding sector of the zone of interest, partition the images into mesh units of predetermined dimensions, and identify mesh units comprising no mark which can be attributed to an unwanted element.

It preferably further comprises a module 132 for controlling the large-field system 11 and the high-resolution system 12 for the acquiring of images, in particular of the zone of interest 20 of the surface of the Earth 22. This control includes, in particular, the triggering and the stopping of taking of images by each system, as well as the orientation of the field of view 121 of the high-resolution system 12.

The system 13 for analysing images and for controlling, can also comprise a calculation module 133 configured to determine an order of priority of sectors of the zone of interest 20 for the acquiring images by the high-resolution system, according to predetermined criteria and/or according to preestablished determination modes, in particular according to the meteorological data relating to the zone of interest 20, and optionally, according to the data of direction and speed of movement of the aerial platform 10 above the zone of interest 20.

This calculation module 133 is preferably capable of comparing several images taken successively of the zone of interest 20, to track unwanted elements in movement therein and to determine the movement speed thereof.

The system 13 for analysing images and for controlling can otherwise be placed in a remote control system on the ground.

In any case, it can advantageously be configured to operate fully automatically, based on operating instructions predefined by an operator.

For the implementation of the method according to the invention, the movements of the platform 10 can be remotely controlled by a control device 21, in particular on the ground, conventionally in itself.

This remote control device 21 can be configured to control the different phases implemented by the platform 10. To this end, the control device 21 and the platform 10 each comprise conventional remote communication means. The control device 21 is in particular adapted to determine control signals which are sent to the platform 10.

The main steps of a method according to a particular embodiment of the invention are illustrated in FIG. 2, in the form of a block diagram.

This method comprises a succession of observation cycles 30, which are implemented while the platform 10 remains in a quasi-stationary position above the zone of interest 20. Each observation cycle 30 comprises the following different steps.

In a first step, the acquiring 301 of an image of the zone of interest 20 is carried out by the large-field system 11. An image 40 is thus obtained, with a low resolution, of the zone of interest 20. An example of such an image 40 is illustrated schematically and a/ in FIG. 3. This image represents a zone of interest comprising a body of water (in white in the figure) and a body of land (shaded in the figure).

The observation cycle 30 then comprises two steps which can be implemented successively, in any order, or simultaneously, the order of presentation shown in FIG. 3 not being at all limiting of the invention.

One of these steps consists of the partitioning 302 of the image 40 acquired by the large-field system, called preliminary image, in a plurality of mesh units 41 each corresponding to a sector of the zone of interest 20 capable of being encompassed in the field of view 121 of the high-resolution system 12. In the particular example represented in FIG. 3, the preliminary image 40 is partitioned according to a regular grid pattern, in mesh units 41 each corresponding to the surface of the field of view 121 of the high-resolution system 12. Such a partitioning example is however not at all limiting of the invention. The partitioning is preferably carried out such that the contiguous mesh units 40 overlap at their peripheral edges, so as to ensure that the zone of interest 20 will be well-observed in any point.

Another of these steps consists of analysing 303 the preliminary image 40 to detect therein the potential presence of marks representative of unwanted elements in or above the zone of interest 40. In the particular example represented in FIG. 3, two types of marks are represented: marks 42 representative of clouds and the shadows thereof, and a mark 42' representative of the reflection of the sun on water.

In the diagram in FIG. 3, the partitioning step 302 is represented before the analysis step 303. Such an order is however not at all limiting of the invention. These two steps can equally also be carried out in the reverse order, or simultaneously.

In a following step, the observation cycle 30 comprises the identification 304 of mesh units 411 of the preliminary image 40 comprising no mark representative of unwanted elements. These mesh units 411, represented without any pattern in FIG. 3, correspond to so-called favourable sectors of the zone of interest 20. The mesh units 412 comprising a mark 42 or 42' representative of an unwanted element are represented with a striped pattern in FIG. 3.

The observation cycle 30 can then optionally comprise a step 305 of determining an order of priority of sectors of the zone of interest 20 for the acquiring of images by the high-resolution system 12, according to predetermined criteria. One of these criteria can in particular be the remaining time before the exiting of each sector outside of the field of regard of the high-resolution system 12. Another of these criteria can be the remaining time before the appearance in each sector of an unwanted element.

The observation cycle can then, for example, first comprise a step 3051 of comparing two preliminary images 40 taken in different observation cycles 30, then, from information drawn from this comparison, and from the known time interval between the respective preliminary image 40 acquisitions of the two observation cycles 30, determining 3052 the direction and the speed of movement of each unwanted element above the zone of interest 20.

From the data thus obtained, the method can then comprise:

determining 3053, for each favourable sector of the zone of interest 20, the remaining time before the appearance of an unwanted element, then, classifying 3054 said sectors by order of priority for the acquiring of images by the high-resolution system. A higher degree of priority is thus attributed to the favourable sectors for which the remaining time before the appearance of an unwanted element is the shortest. This time must however be greater than the time necessary for the acquiring of an image by the high-resolution system 12.

The method according to the invention thus makes it advantageously possible to prioritize the acquiring of images, by the high-resolution system 12, for the sectors in or above which there appears no unwanted element such as clouds or the reflection of the sun. Among these so-called favourable sectors, it furthermore assigns an order of priority to the sectors for which the situation will be degraded the more quickly, according to the ongoing movements of the unwanted elements. All of these prioritisations make it possible to acquire images of all of the zone of interest 20 as quickly as the observation conditions, in particular the meteorological conditions, make it possible.

Optionally, an even higher degree of priority is attributed to the favourable sectors located at the edge of the field of regard of the high-resolution system 12, for which the remaining time before the exiting thereof outside of this field of regard is the shortest.

In a following step, the observation cycle comprises the acquiring 306 of an image, called final image, of several, and if possible of all, favourable sectors by the high-resolution system 12, according to the order of priority previously defined.

The observation cycle 30 then comprises an analysis step 307, aiming on the one hand, to validate the final images that have been acquired, and on the other hand, to verify if a predetermined rate of sectors of the zone of interest 20 for which a final image has been acquired by the high-resolution system and validated has (or not) been achieved. This rate is preferably 100%.

If this is not the case, the method according to the invention comprises the repeating 308 of the observation cycle 30 as many times as necessary, until this rate is achieved. Preferably, the sectors of the zone of interest 20 for which a final image has already been acquired and validated, are not subjected to image acquiring by the high-resolution system 12 during the following observation cycles 30.

At the end of this method, a clear image of all of the zone of interest 20 is obtained.

If the cloud coverage of the zone of interest had not allowed it, according to the time that one would have been wanted to allocate for the acquiring of high-resolution images of this zone of interest, it could have been decided according to the invention to carry out less observation cycles, and to settle for a rate of less than 100% of final images with no unwanted marks. In any case, for a given result, in terms of surface of the zone of interest for which a high-resolution image with absolutely no unwanted marks has been able to be acquired, the time spent to obtain this result by means of the method according to the invention is less than that that would have been required by the methods of the prior art.

FIG. 3 schematically illustrates successive preliminary images 40, 40' and 40" acquired by the large-field system 11 according to the invention.

In the first image 40, shown in a/ as has been outlined above, the presence of marks 42, 42' representative of elements which are unwanted for a satisfactory observation of the zone of interest 20, is observed. These marks correspond respectively to clouds and the shadows thereof and to the reflection of the sun. According to the method of the invention, as has been outlined above, in the ongoing observation cycle, only the sectors corresponding to the mesh units 411 having no unwanted mark are subjected to image acquiring by the high-resolution system 12. The sectors correspond to the mesh units 412 having such a mark, indicated by a striped pattern in the figure, are not observed by the high-resolution system 12.

In the following observation cycle 30, a preliminary image 40' is obtained, which is different from the preliminary image 40. As can be seen in b/in FIG. 3, the marks representative of unwanted elements have moved. In this new observation cycle 30, the sectors corresponding to the mesh units 413 for which an image has been acquired by the high-resolution system 12 in the preceding cycle and validated are not observed again. The sectors corresponding to the mesh units 412' having an unwanted mark are not observed either. Only the sectors corresponding to the mesh units 411 not comprising any mark, which have not been observed by the high-resolution system 12 in the preceding cycle, are observed.

In the particular example illustrated in FIG. 3, at this stage, all the mesh units 41 have led to observation of the corresponding sector by the high-resolution system 12, except for one. This mesh unit 411 is identified on the image 40" shown in c/ in the figure. Due to the movement of the mark 42' representative of the reflection of the sun, this mesh 411 is now devoid of any unwanted marks. The corresponding sector can therefore be subjected, in the 3$^{rd}$ observation cycle 30, to image acquisition by the high-resolution system 12.

At the end of the three cycles, all of the sectors of the zone of interest 20 have been observed, under satisfactory observation conditions, by the high-resolution system 12. For the particular example illustrated in FIG. 3, this has been carried out very quickly.

FIG. 4 illustrates a preliminary image 40 acquired during an observation cycle 30, for a more sophisticated embodiment of the method according to the invention.

The mesh units 41 can be seen therein, some of which contain unwanted marks 42, 42'. The mesh units 411, represented without any patterns in the figure, correspond to the favourable sectors. Among these mesh units, it can be identified the most favourable mesh units 411', indicated by a grid pattern in the figure, corresponding to the sectors of the zone of interest 20 for which the conditions will be degraded the most quickly, and that must be observed in priority by the high-resolution system 12. These mesh units 411' have advantageously been identified by the method according to the invention, from, in particular, an extrapolation of the movement of the unwanted elements 42, 42', by considering, in particular, the respective movement direction 421, 421' thereof.

Particular examples of the method according to the invention are described below.

EXAMPLE 1

In this example, the platform is a HAPS at 20 km of altitude comprising a high-resolution image acquisition system (resolution on the ground GSD=0.2 m) of which the field of view of 1.2×1.2 km can access any point of the field of regard of 20×20 km thereof at a cadence of 2 Hz (comprising the time necessary for the change of sight axis, the stabilisation time and the actual image acquisition time). This field of regard is entirely encompassed by a large-field image acquisition system of resolution on the ground GSD=15 m. The two systems are, for example, multispectral in the visible.

The HAPS moves with respect to the ground at a speed of 10 m/s northwards.

The clouds present in the field of regard of the high-resolution system move with respect to the ground at a speed of 20 m/s eastwards.

The field of regard of the high-resolution system is subdivided into 400 contiguous square mesh units, each of dimensions 1×1 km. The aim is to capture high-resolution images of the greatest number of mesh units as possible, and even of all of them, in good observation conditions, i.e. without cloud or cloud shadow, and without reflection of the sun. The field of view of the high-resolution system is larger than a mesh unit, which makes it possible for an overlapping and the merging of the mesh units into a continuous mosaic by post-treatment.

The zone of interest of the surface of the Earth is a sub-portion of the field of regard of the high-resolution system.

The observation cycles of the method according to the invention succeed one another every 10 s, and comprise:
  the acquiring of all of the zone corresponding to the field of regard of the high-resolution system by the large-field system and the estimation of the observation conditions of each mesh unit;
  the prioritisation of the mesh units, according to the following criteria:
    priority to those not acquired, then to those already acquired but not validated,
    then, within these subgroups, priority to those which will very soon not be visible, which are located here at the south edge of the field,
    then, within these subgroups, prioritisation according to both the quality of the observation conditions (absence of defect, proximity of the nadir) and the imminence of the arrival of a defect (movement of the clouds eastwards, etc.);
  acquiring of the 20 mesh units (at an acquiring frequency of 2 Hz) considered to be priority;
  validation of the mesh units acquired under satisfactory conditions (either according to the coverage estimation on the preliminary image acquired by the large-field system, or by a new estimation on the high-resolution image acquired).

After 100 s, the field of regard of the high-resolution system has moved by a distance corresponding to one mesh unit and the clouds have moved by 2 mesh units.

After 1000 s, the field of regard of the high-resolution system has moved by half and the clouds have fully passed through this field of regard.

The high-resolution acquiring of all of the zone of interest has been carried out.

EXAMPLE 2

In this example, the platform is a geostationary satellite, comprising a high-resolution system (of resolution on the ground GSD 4 m) of which the field of view of 100×100 km can access any point of the circular field of regard having a radius on the ground of around 8,000 km at a cadence of one image every 45 s.

This field of regard is fully encompassed by a large-field system of resolution on the ground GSD of around 500 m, integrated or carried by a meteorological satellite, capable of acquiring an image every 15 minutes.

The zone of interest is a sub-portion of the field of regard of the high-resolution system. It is subdivided into contiguous cells of 90×90 km. The method is then implemented as described in example 1, with observation cycles of a duration of 15 minutes.

The invention claimed is:

1. A method for acquiring images of the surface of the Earth, comprising:
   placing of a first aerial or space platform in a stationary position above said surface of the Earth or moving at a speed less than 200 km/h above said surface of the Earth, said first platform comprising a first image acquisition system with a field of view covering a zone, called zone of interest, of said surface of the Earth,
   placing of a second aerial or space platform in a stationary position above said surface of the Earth or moving at a speed less than 200 km/h above said surface of the Earth, said second platform comprising a second image acquisition system with a narrower field of view and of better resolution than the first image acquisition system, the field of view of said second image acquisition system being orientable such that a field of regard of said second image acquisition system covers said zone of interest,
   implementing an observation cycle comprising steps of:
   (a) acquiring an image of said zone of interest by said first image acquisition system,
   (b) partitioning of the image thus acquired, called preliminary image, in mesh units each corresponding to a sector of said zone of interest capable of being included in the field of view of the second image acquisition system,
   (c) analysing said preliminary image, to detect potential presence of marks representative of unwanted elements in or above the zone of interest,
   (d) identifying mesh units of said preliminary image comprising no mark representative of unwanted elements, said mesh units comprising no mark representative of unwanted elements corresponding to so-called favourable sectors of said zone of interest,
   (e) and, if applicable, acquiring an image, called final image, of favourable sector(s) by said second image acquisition system,
   and, if a predetermined rate of sectors of the zone of interest for which a final image has been acquired by the second image acquisition system has not been achieved, repeat(s) of the observation cycle until said rate is achieved.

2. The method according to claim 1, wherein the first platform and the second platform are one single and same platform.

3. The method according to claim 1, further comprising a step of validating conformity of the final images(s) acquired by the second image acquisition system with respect to a pre-established criterion, and, if a predetermined validation rate of sectors of the zone of interest for which a final image has been validated has not been achieved, repeat(s) of the observation cycle until said predetermined validation rate is achieved.

4. The method according to claim 1, wherein, for an observation cycle, no acquiring of a final image by the second image acquisition system is carried out for the sectors of said zone of interest for which a final image has been acquired, or optionally, acquired and validated, during a preceding observation cycle.

5. The method according to claim 1, comprising, for at least one observation cycle, after step (d) of identifying mesh units of said preliminary image comprising no mark representative of unwanted elements, a step of determining an order of priority of the sectors of said zone of interest for the acquiring of images by the second image acquisition system, according to one or more pre-established criterion/criteria.

6. The method according to claim 5, wherein said second aerial or space platform moves at a speed less than 200 km/h above said surface of the Earth and in said step of determining an order of priority of the sectors of said zone of interest for the acquiring of images by the second image acquisition system, a higher degree of priority is attributed to the favourable sectors for which time remaining before exiting thereof outside of the field of regard of the second image acquisition system is the shortest, while being greater than a time necessary for the acquiring of an image thereof by said second image acquisition system.

7. The method according to claim 5, wherein said step of determining an order of priority of the sectors of said zone of interest for the acquiring of images by the second image acquisition system comprises:
   (f) from data of direction and speed of movement of each unwanted element in or above the zone of interest, determination for each favourable sector of the zone of interest for which a final image has not yet been acquired, of time remaining before an appearance of an unwanted element, and
   (g) classifying said sectors by order of priority for the acquiring of images by the second image acquisition system, an even higher degree of priority being attributed to the favourable sectors for which the time remaining before the appearance of an unwanted element is the shortest, while being greater than a time necessary for the acquiring of an image thereof by the second image acquisition system.

8. The method according to claim 7, comprising for said at least one observation cycle, a step of determining said data of direction and speed of movement of each unwanted element in or above the zone of interest by:
   (f1) comparing the preliminary image acquired during said at least one observation cycle with a preliminary image acquired during a preceding observation cycle, and
   (f2) determining, from said comparison and from a time interval between the respective acquisitions of the preliminary images of said two observation cycles, of said data of direction and speed of movement of each unwanted element in or above the zone of interest.

9. The method according to claim 1, wherein a time interval between respective steps (a) of acquiring an image of said zone of interest by said first image acquisition system, of two successive observation cycles is of between 1 second and 2 minutes.

10. The method according to claim 1, wherein, for step (e) of acquiring an image of each of the sectors of said zone of interest, a frequency for acquiring images by said second image acquisition system is of between 1 and 50 images per second.

11. The method according to claim 1, wherein said first platform and said second platform are placed at an altitude greater than 10 km above the zone of interest.

12. The method according to claim 1, wherein said first platform moves above the surface of the Earth in such a way that the zone of interest remains in the field of view of said first image acquisition system for at least 5 minutes, and said second platform moves above the surface of the Earth in such a way that the zone of interest remains in the field of regard of said second image acquisition system for at least 5 minutes.

13. The method according to claim 1, wherein step (b) of partitioning the preliminary image in mesh units is carried out such that contiguous mesh units overlap at their peripheral edges.

14. The method according to claim 1, implementing simultaneously a plurality of second image acquisition systems.

15. A computer program product comprising a non-transitory electronic memory comprising a set of program code instructions which, when they are executed by a processor, implement a method for acquiring images according to claim 1.

16. A device for acquiring images of the surface of the Earth, comprising:
- a first aerial or space platform configured to be able to be maintained in a stationary position above the surface of the Earth, or to move at a speed less than 200 km/h above the surface of the Earth, said first platform comprising a first image acquisition system configured such that a field of view thereof can cover a zone of said surface of the Earth, called zone of interest, when said first platform is placed above said surface of the Earth;
- a second aerial or space platform configured to be able to be maintained in a stationary position above said surface of the Earth, or to move at a speed less than 200 km/h above said surface of the Earth, said second platform comprising a second image acquisition system having a narrower field of view and a better resolution than the first image acquisition system, the field of view of said second image acquisition system being orientable and configured such that a field of regard of said second image acquisition system ca cover said zone of interest when said second platform is placed above said zone of interest; and
- a system for analysing images and for controlling the first image acquisition system and the second image acquisition system for implementation of an observation cycle of a method, comprising:
  placing of the first aerial or space platform above said surface of the Earth,
  placing of the second aerial or space platform above said surface of the Earth,
  implementing the observation cycle, the observation cycle comprising steps of:
  (a) acquiring an image of said zone of interest by said first image acquisition system,
  (b) partitioning of the image thus acquired, called preliminary image, in mesh units each corresponding to a sector of said zone of interest capable of being included in the field of view of the second image acquisition system,
  (c) analyzing said preliminary image, to detect potential presence of marks representative of unwanted elements in or above the zone of interest,
  (d) identifying mesh units of said preliminary image comprising no mark representative of unwanted elements, said mesh units comprising no mark representative of unwanted elements corresponding to so-called favourable sectors of said zone of interest,
  (e) and, if applicable, acquiring an image, called final image, of favourable sector(s) by said second image acquisition system,
  and, if a predetermined rate of sectors of the zone of interest for which a final image has been acquired by the second image acquisition system has not been achieved, repeat(s) of the observation cycle until said rate is achieved, and the potential repeat(s) of this observation cycle.

17. The device according to claim 16, wherein the first platform and the second platform are one single and same platform.

18. The device according to claim 16, wherein the system for analysing images and controlling, comprises:
- a module for analysing images for detecting marks on each preliminary image acquired by the first image acquisition system, the partitioning of said each preliminary image in mesh units and identifying mesh units that comprise no mark representative of an unwanted element above the zone of interest, and
- a module for controlling the first image acquisition system and the second image acquisition system for the acquiring of images.

19. The device according to claim 16, wherein the system for analysing images and for controlling comprises a calculation module configured to determine, for at least one observation cycle, an order of priority of the sectors of said zone of interest for the acquiring of images by the second image acquisition system, according to one or more pre-established criterion/criteria.

20. The device according to claim 19, wherein said calculation module is configured to determine, for said at least one observation cycle, an order of priority of the sectors of said zone of interest for the acquiring of images by the second image acquisition system, by:
- from data of direction and speed of movement of each unwanted element in or above the zone of interest, determining for each favourable sector of the zone of interest for which a final image has not yet been acquired, time remaining before an appearance of an unwanted element, and
- classifying of said sectors by order of priority for the acquiring of images by the second image acquisition system, an even higher degree of priority being attributed to the favourable sectors for which the time remaining before the appearance of an unwanted element is the shortest, while being greater than a time necessary for the acquiring of an image thereof by the second image acquisition system.

21. The device according to claim 20, wherein the calculation module is configured to carry out, for said at least one observation cycle, comparison of the preliminary image acquired during said at least one observation cycle with a preliminary image acquired during a preceding observation cycle, and determining, from said comparison and from a time interval between the respective acquisitions of the preliminary images of said two observation cycles, of the direction and of the speed of movement of each unwanted element in or above the zone of interest.

22. A method for remotely controlling a device for acquiring images of the surface of the Earth, comprising:
- placing of a first aerial or space platform in a stationary position above said surface of the Earth or moving at a speed less than 200 km/h above said surface of the Earth, said first platform comprising a first image acquisition system with a field of view covering a zone, called zone of interest, of said surface of the Earth,
- placing of a second aerial or space platform in a stationary position above said surface of the Earth or moving at a speed less than 200 km/h above said surface of the Earth, said second platform comprising a second image acquisition system with a narrower field of view and of better resolution than the first image acquisition system, the field of view of said second image acquisition system being orientable such that a field of regard of said second image acquisition system covers said zone of interest,
- implementing an observation cycle comprising steps of:
  - (a) acquiring an image of said zone of interest by said first image acquisition system,
  - (b) partitioning of the image thus acquired, called preliminary image, in mesh units each corresponding to a sector of said zone of interest capable of being included in the field of view of the second image acquisition system,
  - (c) analysing said preliminary image, to detect potential presence of marks representative of unwanted elements in or above the zone of interest,
  - (d) identifying mesh units of said preliminary image comprising no mark representative of unwanted elements, said mesh units comprising no mark representative of unwanted elements corresponding to so-called favourable sectors of said zone of interest,
  - (e) and, if applicable, acquiring an image, called final image, of favourable sector(s) by said second image acquisition system,
- and, if a predetermined rate of sectors of the zone of interest for which a final image has been acquired by the second image acquisition system has not been achieved, repeat(s) of the observation cycle until said rate is achieved,
- wherein said device for the acquiring of images comprises said first aerial or space platform, said second aerial or space platform and a system for analysing images and for controlling the first image acquisition system and the second image acquisition system for the implementation of the steps of the observation cycle,
- wherein said device for the acquiring of images is remotely controlled by a control device, control signals being successively determined and sent to said device for the acquiring of images by this control device, to carry out said steps.

23. A control device comprising means configured to control, remotely, a device for acquiring images of the surface of the Earth, comprising:
- a first aerial or space platform in a stationary position above said surface of the Earth or moving at a speed less than 200 km/h above said surface of the Earth, said first platform comprising a first image acquisition system with a field of view covering a zone, called zone of interest, of said surface of the Earth;
- a second aerial or space platform in a stationary position above said surface of the Earth or moving at a speed less than 200 km/h above said surface of the Earth, said second platform comprising a second image acquisition system with a narrower field of view and of better resolution than the first image acquisition system, the field of view of said second image acquisition system being orientable such that a field of regard of said second image acquisition system covers said zone of interest; and
- a system for analysing images and for controlling the first image acquisition system and the second image acquisition system for implementation of an observation cycle;
- wherein said control device controls said device by transmission of successive control signals to said device for the acquiring of images, to carry out all of the steps of a method for acquiring images comprising:
- placing of the first aerial or space platform above said surface of the Earth;
- placing of the second aerial or space platform above said surface of the Earth;
- implementing the observation cycle, the observation cycle comprising steps of:
  - (a) acquiring an image of said zone of interest by said first image acquisition system,
  - (b) partitioning of the image thus acquired, called preliminary image, in mesh units each corresponding to a sector of said zone of interest capable of being included in the field of view of the second image acquisition system,
  - (c) analysing said preliminary image, to detect potential presence of marks representative of unwanted elements in or above the zone of interest,
  - (d) identifying mesh units of said preliminary image comprising no mark representative of unwanted elements, said mesh units comprising no mark representative of unwanted elements corresponding to so-called favourable sectors of said zone of interest,
  - (e) and, if applicable, acquiring an image, called final image, of favourable sector(s) by said second image acquisition system,
- and, if a predetermined rate of sectors of the zone of interest for which a final image has been acquired by the second image acquisition system has not been achieved, repeat(s) of the observation cycle until said rate is achieved.

* * * * *